United States Patent
Sunder et al.

(10) Patent No.: US 9,087,188 B2
(45) Date of Patent: Jul. 21, 2015

(54) PROVIDING AUTHENTICATED ANTI-VIRUS AGENTS A DIRECT ACCESS TO SCAN MEMORY

(75) Inventors: Divya Naidu Kolar Sunder, Hillsboro, OR (US); David M. Durham, Beaverton, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 942 days.

(21) Appl. No.: 12/609,961

(22) Filed: Oct. 30, 2009

(65) Prior Publication Data

US 2011/0107423 A1    May 5, 2011

(51) Int. Cl.
*G06F 21/51*    (2013.01)
*G06F 21/56*    (2013.01)

(52) U.S. Cl.
CPC .............. *G06F 21/51* (2013.01); *G06F 21/56* (2013.01); *G06F 21/567* (2013.01)

(58) Field of Classification Search
CPC ......... G06F 21/00; G06F 21/30; G06F 21/44; G06F 21/50–21/51; G06F 21/55–21/568; G06F 21/57; G06F 21/572; G06F 21/70–21/71; G06F 21/75–21/76; G06F 21/79; G06F 12/14; G06F 12/1416; G06F 12/1433; H04L 63/12–63/126; H04L 63/18; H04L 9/32; H04L 9/3223; H04L 9/3236–9/3242; H04L 9/3247–9/3257
USPC ............... 726/16–17, 26–27, 2–4, 21–24, 30; 713/187–189, 191–194; 710/107, 110; 707/781–783; 711/6, 100, 154, 163, 711/167, 169; 717/168, 171, 173
See application file for complete search history.

(56) References Cited

U.S. PATENT DOCUMENTS 5,826,012 A * 10/1998 Lettvin ........................... 726/22
6,094,731 A *  7/2000 Waldin et al. ............... 714/38.14
(Continued)

FOREIGN PATENT DOCUMENTS

CN         1795439       6/2006
TW      2003-208325 A   7/2003
(Continued)

OTHER PUBLICATIONS

Bulygin et al. "Chipset Based Approach to Detect Virtualization Malware a.k.a. DeepWatch" [Online], Aug. 6-7BlackHat USA 2008 Briefing, [Retrieved on: May, 15, 2014], Intel Product Security Incident Response Team. Retrieved from: < http://www.hakim.ws/BHUSA08/speakers/Bulygin_Detection_of_Rootkits/bh-us-08-bulygin_Chip_Based_Approach_to_Detect_Rootkits.pdf >.*

(Continued)

*Primary Examiner* — Saleh Najjar
*Assistant Examiner* — Eric W Shepperd
(74) *Attorney, Agent, or Firm* — Blakely, Sokoloff, Taylor & Zafman LLP (57) ABSTRACT

A computer platform may support anti-virus agents that may be provided access to directly scan the memory. The computer platform may comprise a platform control hub, which may comprise a manageability engine and a virtualizer engine, wherein the manageability engine may allow the anti-virus agents to be downloaded to a platform hardware space that is isolated from an operating system. The manageability engine may authenticate the anti-virus agents and provide an access for the anti-virus agents to directly scan a memory or a storage device coupled to the platform hardware.

16 Claims, 4 Drawing Sheets

(56) References Cited

U.S. PATENT DOCUMENTS

| | | | |
|---|---|---|---|
| 6,347,375 B1* | 2/2002 | Reinert et al. | 726/24 |
| 6,728,886 B1* | 4/2004 | Ji et al. | 726/24 |
| 7,310,817 B2* | 12/2007 | Hinchliffe et al. | 726/24 |
| 7,673,343 B1* | 3/2010 | Barton et al. | 726/24 |
| 7,685,640 B2* | 3/2010 | Azadet et al. | 726/24 |
| 7,853,999 B2* | 12/2010 | Khilnani et al. | 726/14 |
| 8,214,653 B1* | 7/2012 | Marr et al. | 713/189 |
| 8,356,361 B2* | 1/2013 | Werner et al. | 726/34 |
| 8,375,449 B1* | 2/2013 | Zhou et al. | 726/24 |
| 8,443,450 B1* | 5/2013 | Zhou et al. | 726/24 |
| 8,566,571 B2* | 10/2013 | Beachem et al. | 713/2 |
| 2002/0042886 A1* | 4/2002 | Lahti et al. | 713/201 |
| 2003/0120951 A1* | 6/2003 | Gartside et al. | 713/201 |
| 2005/0071668 A1 | 3/2005 | Yoon et al. | |
| 2006/0143600 A1* | 6/2006 | Cottrell et al. | 717/168 |
| 2006/0195904 A1* | 8/2006 | Williams | 726/24 |
| 2007/0174910 A1* | 7/2007 | Zachman et al. | 726/18 |
| 2007/0261118 A1* | 11/2007 | Lu | 726/24 |
| 2007/0283440 A1* | 12/2007 | Yao et al. | 726/24 |
| 2008/0098478 A1* | 4/2008 | Vaidya et al. | 726/24 |
| 2008/0134321 A1* | 6/2008 | Rajagopal et al. | 726/21 |
| 2008/0282351 A1 | 11/2008 | Khilnani et al. | |
| 2008/0320423 A1* | 12/2008 | Awad et al. | 716/5 |
| 2009/0138969 A1* | 5/2009 | Kim et al. | 726/22 |
| 2010/0058432 A1* | 3/2010 | Neystadt et al. | 726/1 |
| 2010/0154062 A1* | 6/2010 | Baram et al. | 726/24 |
| 2011/0289308 A1* | 11/2011 | Sobko et al. | 713/100 |
| 2013/0061326 A1* | 3/2013 | Bennett | 726/24 |

FOREIGN PATENT DOCUMENTS

| | | |
|---|---|---|
| WO | WO2004086228 | 10/2004 |
| WO | WO2008005067 | 1/2008 |
| WO | WO2008140977 | 11/2008 |

OTHER PUBLICATIONS

Lin et al. "Hardware Software Codesign for High-speed Signature-based Virus Scanning" [Online], Sep. 25, 2009 [Retrieved on: May 16, 2014], Micro, IEEE, vol. PP, issue 99. Retrieved from < http://ieeexplore.ieee.org/stamp/stamp.jsp?tp=&arnumber=5262932 >.*

Klien, Tobias, "Process Dump Analyses: Forensical acquisition and analyses of volatile data" [Online], Jul. 22, 2006 [Retrieved on: May 17, 2014]. < Retrieved from: http://www.trapkit.de/papers/ProcessDumpAnalyses_v1.0_20060722.pdf >.*

CN Search Report, CN201010538430.0, May 20, 2014, 2 pages.

CN Search Report, CN201010538430.0, Feb. 28, 2013, 2 pages.

EP Search Report, EP10187860.1-1243, Jul. 2, 2012, 7 pages.

* cited by examiner

PROVIDING AUTHENTICATED ANTI-VIRUS AGENTS A DIRECT ACCESS TO SCAN MEMORY

BACKGROUND

Recent malware attacks target the security software and thus compromise the host operating system. Unfortunately, computer worms such as 'Conficker' may be successful in compromising security software and may thus prevent access to web-sites that provide anti-virus software for download. Independent software vendors (ISV) may provide such websites that make anti-virus software available for download. Other malware attacks may shim or rootkit local antivirus agents preventing them from performing functions such as scanning the disk or memory for virus signatures.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a computer platform that provide authenticated anti-virus agents a direct access to scan memory and storage according to one embodiment. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, hardware logic of the computer platform may be used to safely execute authenticated anti-virus agents while providing the authenticated anti-virus agents a direct access to scan memory and storage. Such an approach may allow the authenticated anti-virus agents to scan the host operating system. In one embodiment, one or more anti-virus agents may be downloaded to a third party data source (3pds) or extended third party data source (e3pds) associated with the platform hardware. In one embodiment, the anti-virus agents may be downloaded locally through a host embedded control interface (HECI) or remotely over out-of-band mechanism to ensure that the installation is not interrupted by the malware running on the operating system.

After downloading the anti-virus agents, the firmware of the platform hardware may authenticate the anti-virus agents and verify if the antivirus agents are from a trusted vendor before loading, for example, byte code of the anti-virus agent to an interpreter and executing. As an anti-virus agent is verified, the platform hardware may allow the anti-virus agent to access application programmable interfaces (APIs) and manageability engine control interface (MECI). In one embodiment, access to APIs may enable direct scanning of the memory through a DMA engine and access to HECI may allow the anti-virus agent to scan storage through a virtual engine (VE).

As a result, in one embodiment, the authenticated anti-virus agent may be allowed to access the storage and the memory local to the computer system while the anti-virus agent may be supported by tamper-resistant platform hardware. Also, the ISV's that provide anti-virus solutions may be allowed to directly download data files with virus and whitelist virus signatures and the anti-virus agent may generate a log of instances of identified and/or cleaned viruses.

Figure 1:
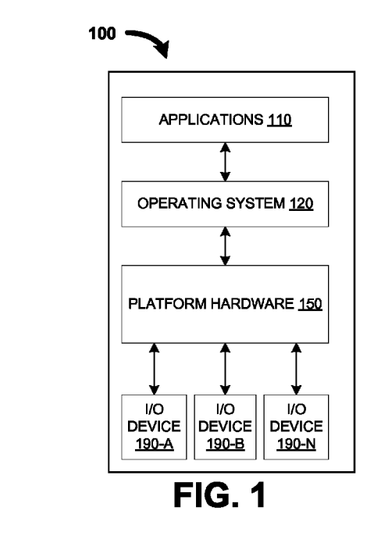
FIG. 1 illustrates a computer platform 100, which supports a technique to provide authenticated anti-virus agents a direct access to scan memory and storage according to one embodiment.

An embodiment of a computer platform 100, which may support techniques to provide anti-virus agents a direct access to scan memory and storage is Illustrated in FIG. 1. In one embodiment, the computer platform 100 may comprise applications 110, a host operating system (OS) 120, a platform hardware 150, and I/O devices 190. In one embodiment, the applications 110 may comprise one or more applications supported by the host OS 120 and the platform hardware 150.

In one embodiment, the platform hardware 150 may comprise one or more processing cores, chipset, memory, and such other similar hardware components. In one embodiment, the platform hardware 150 may support components such as a firmware, manageability engine (ME) and virtualizer engine (VE). In one embodiment, the platform hardware 150 may authenticate the anti-virus agent downloaded locally or remotely before safely executing the authenticated anti-virus agent while providing the authenticated anti-virus agent a direct access to scan a memory and a storage device.

Such an approach may allow the authenticated anti-virus agents to scan the host operating system. In one embodiment, one of the I/O devices 190-A to 190-N may include a storage device such as hard-disk, universal serial bus (USB) based devices. Also, one of the I/O devices 190-A to 190-N such as a network interface card (NIC) may support out-of-band communication mechanism.

Figure 2:
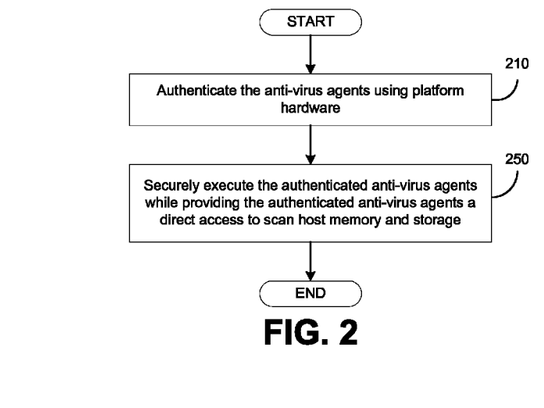
FIG. 2 is a flow-chart illustrating the providing of authenticated anti-virus agents a direct access to scan memory and storage according to one embodiment.

An embodiment of an operation of the computer platform 100, which may support techniques to provide anti-virus agents a direct access to scan memory and storage is illustrated in flow-chart of FIG. 2.

In block 210, the platform hardware 150 may authenticate anti-virus agents that may be downloaded to the computer platform 150. In one embodiment, the computer platform 150 may authenticate the anti-virus agents based on signature verification or behavior based verification.

In block 250, the platform hardware 150 may securely execute the authenticated anti-virus agents while providing the anti-virus agents a direct access to scan host memory and storage. In one embodiment, the platform hardware 150 may allow the anti-virus agents to scan the host memory and storage directly as the anti-virus agents are authenticated prior to executing byte code of the anti-virus agents.

Figure 3:
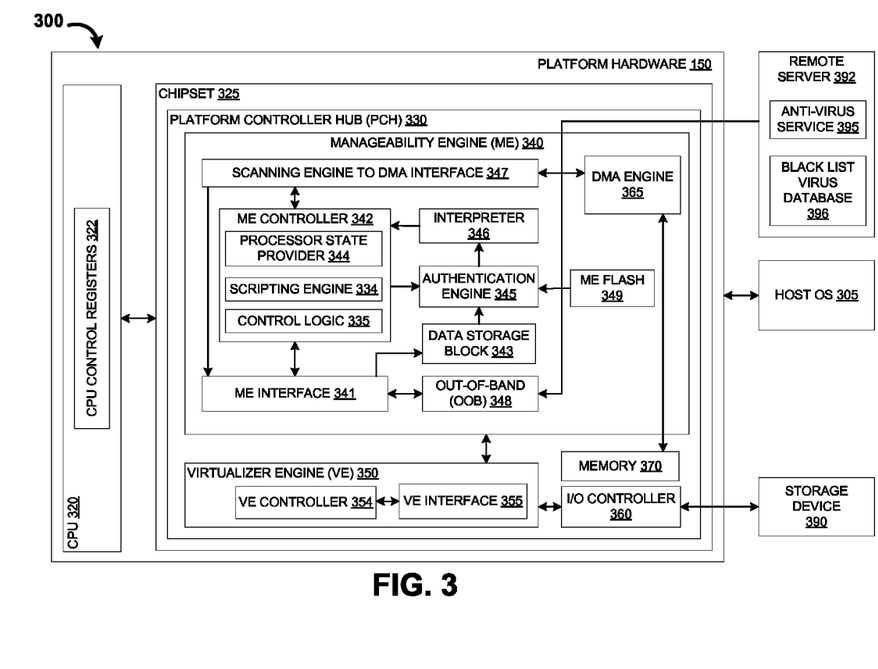
FIG. 3 illustrates a platform based architecture, which may support to provide authenticated anti-virus agents a direct access to scan memory and storage according to one embodiment.

An embodiment of a platform architecture 300 comprising hardware and firmware components that support techniques to provide anti-virus agents a direct access to scan memory and storage are illustrated in FIG. 3. In one embodiment, the platform hardware 150 may include a central processing unit 320 and a chipset 325, which may support a platform control hub (PCH) 330. In one embodiment, the CPU 320 may support a host OS 305, which may manage the resources available in the platform hardware 150.

In one embodiment, the platform controller hub PCH 330 may comprise a manageability engine ME 340, a virtualizer engine VE 350, an I/O controller 360, a DMA engine 365, and a memory 370. In one embodiment, the storage device 390 and the remote server 392 may be coupled to the platform hardware 150. In one embodiment, the manageability engine (ME) 340 may comprise a ME interface 341, a ME controller 342, a data storage block 343, an authentication engine 345, an interpreter 346, a scanning to DMA interface 347, and an out-of-band (OOB) communication block 348. In one embodiment, the virtualizer engine 350 may comprise a virtualizer engine (VE) controller 354 and a VE interface 355.

In one embodiment, the virtualizer engine VE 350 may comprise a virtualizer engine (VE) controller 354 and a virtualizer engine (VE) interface 355. In one embodiment, the VE interface 355 may support exchange of information between the VE 350 and ME 340 and the I/O controller 360. In one embodiment, the VE interface 355 may support downloading of the anti-virus agent and the VE controller 354 may send byte code representing the antivirus agent to the ME 340 over a manageability engine control interface (MECI). In one embodiment, VE controller 354 and the VE interface 355 may allow anti-virus agents stored locally on devices such as a USB storage device to be downloaded over a host embedded control interface (HECI). In other embodiment, the antivirus agents supported by the remote server 390 may be downloaded remotely to the ME 340 over out-of-band communication channel supported by the OOB block 348.

In one embodiment, the ME interface 341 may receive byte codes representing the anti-virus agents and store the byte code in the data storage 343. In one embodiment, the ME interface 341 may receive the byte code of the anti-virus agent either from the VE 360 or from the OOB block 348. In one embodiment, the byte code may represent a java byte code. In one embodiment, the ME interface 341 may provide a first signal to the ME controller 342 after storing the byte code in the data storage block 343. In one embodiment, the ME interface 341 may receive a request to scan the host OS 305 that may be generated by the remote server 392 and sent over the OOB block 348. In one embodiment, the ME interface 341 may provide a second signal to the ME controller 342 in response to receiving the request from the remote server 392.

In one embodiment, the data storage block 343 may represent third party data storage (3pds) or extended third party data storage. In one embodiment, the byte code stored in the data storage block 343 may be used for authenticating the anti-virus agents. In one embodiment, the independent software vendor (ISV) may use the data storage block 343 and the OOB communication block 348 to directly download data files with virus and whitelisting signatures that may be used by the anti-virus agents for scanning the data files and providing a log of identified or cleaned instances. In one embodiment, the anti-virus agents may be downloaded to a hard-disk space that may be stolen by the virtual izer engine 350.

In one embodiment, the authentication engine 345 may authenticate the anti-virus agent by using one or more authentication criteria and validate a scripting engine such as the scripting engine 334 supported by the ME controller 342. In one embodiment, the authentication engine 345 may validate the scripting engine 334 before executing the scripting engine 334 stored in the manageability engine 340's memory such as SRAM. In one embodiment, the authentication engine 345 may compare the signature of the scripting engine 334 with a key that may be stored in a manageability engine flash memory 349 that may be fused during manufacturing or loaded in the optionROM by a host driver. In one embodiment, validating the scripting engine 334 may prevent malicious codes from getting executed in the isolated environment of the manageability engine 340. In one embodiment, after verification of the scripting engine 334 is successful, the authentication engine 345 may perform scanning operations as directed by the anti-virus agents to detect unidentified or malicious signatures that are sent over the network OOB.

In one embodiment, the authentication criteria adopted by the authentication engine 345 for authenticating the anti-virus agents may include checking whether the anti-virus agent is a licensed agent and the source of such anti-virus agent. In one embodiment, the authentication engine 345 may comprise a firmware stack and, in one embodiment, the firmware stack may check the anti-virus agent if the anti-virus agent downloaded is from a trusted independent software vendor and if the anti-virus agent is associated with a valid license. In one embodiment, the authentication engine 345 may authenticate the anti-virus agents if the anti-virus agents pass the authentication criteria. In one embodiment, the authentication engine 345 may generate a first indication after determining that the anti-virus agents are authenticated and may generate a second indication if the anti-virus agents are not authenticated.

In one embodiment, the interpreter 346 may be provided with the authenticated byte code in response to generation of the first indication. In one embodiment, the interpreter 346 may translate the authenticated byte code representing the anti-virus agents and may execute such anti-virus agents. In one embodiment, the interpreter 346 may signal the ME controller 342 after completing the execution of the byte code representing the anti-virus agent.

In one embodiment, the ME controller 342 may comprise a scripting engine 334, a control logic 335, and a processor state provider 344. In one embodiment, the scripting engine 334 may provide an isolated environment to for the anti-virus agents to be processed independent of the state of the operating system. In one embodiment, the scripting engine 334 may be implemented using a Java Applet, which may be verified by the authentication engine 345. In one embodiment, the control logic 335 may delete the scripting engine 334 from the SRAM if the scripting engine 334 fails the authentication performed by the authentication engine 345.

In one embodiment, to initiate the authentication of the anti-virus agents, the control logic 335 may send a signal to the authentication engine 345. In one embodiment, control logic 335 may store the anti-virus agents in the data storage block 343 in response to receiving the first signal from the ME interface 341. In one embodiment, the control logic 335 may use an indication generated by the authentication engine 345 and then process the interpreted version of the byte code generated by the interpreter 346. In one embodiment, the control logic 335 may provide the byte code to the interpreter 346 in response to receiving the first indication.

After receiving the first indication and providing the byte code to the interpreter 346, in one embodiment, the control logic 335 may process the byte code that is interpreted by the interpreter 346. In one embodiment, the control logic 335 may process the authenticated byte code of the anti-virus agent and may allow the anti-virus agent to access the scanning to DMA engine interface 347. In one embodiment, the control logic 335 may inhibit or not provide the byte code to the interpreter 346 in response to receiving the second indication from the authentication engine 345.

In one embodiment, the control logic 335 may initiate the processor state provider 344 in response to receiving the second signal from the ME interface 341. In one embodiment, the second signal may be generated in response to receiving a request to scan the host OS 305 from the remote server 392. In one embodiment, the request to scan the host OS 305 may be generated by the remote server 392 if the computational capabilities of the ME 340 are limited. However, in other embodiment, if the ME 340 includes sufficient computational resources to support a local scanning engine, then the local scanning engine may use the processor states of the CPU 320 to perform scanning of the host OS 305. In one embodiment, a scanning engine whether supported locally within the ME 340 or by the remote serve 392 may need processor states to perform scanning of the host OS 305.

In one embodiment, the processor state provider 344 may gather the processor states by directly accessing the CPU registers 322. In other embodiment, the processor state provider 344 may gather the processor states by accessing the memory location in which the processor states may be stored and the processor state information may be retrieved through the scanning to DMA interface 347. In one embodiment, the processor state may include CPU control register CR0-CR4, Interrupt Descriptor Table Register (IDTR), Global Descriptor Table Register (GDTR), and Extended Page Table Pointer (EPTP), for example. In one embodiment, the control registers may point to the guest physical address of the virtual/linear memory map/page directory, IDTR may point to the linear address of the interrupt descriptor table, GDTR and EPTP may point to the physical address that holds the root directory of the guest physical to physical memory map. In one embodiment, the processor state provider 344 may provide the processor states to the control logic 335 and the control logic 335 may provide the scanning engine, which may be either supported locally by the ME 340 or the remote server 392 to enable the scanning engine to scan the host OS 305.

In one embodiment, the scanning to DMA engine interface 347 may allow the anti-virus agents to scan the memory 370 using a direct memory access (DMA) channel 365. In one embodiment, the scanning to DMA engine interface 347 may allow the anti-virus agent to get an unobstructed view of the memory 370. In one embodiment, the scanning to DMA engine interface 347 may read the physical memory at a given address and allow direct scanning of physical memory pages given the signature pattern. In one embodiment, the scanning to DMA engine interface 347 may be implemented as a base class inside a Java Virtual Machine (JVM) environment. In one embodiment, the scanning to DMA engine interface 347 may also allow the anti-virus agents to scan the storage device 390 using the virtualizer engine 350. In one embodiment, the scanning to DMA engine interface 347 may provide interfaces to access the DMA channel 365 or the virtualizer engine 350.

In one embodiment, the DME engine 365 may provide a direct and unobstructed access to the memory 370. In one embodiment, the DMA engine 365 may represent a driver in a ME kernel. In one embodiment, the DMA engine 365 may set a 'translated bit' in the PCI-e request transaction and may access the memory 370 and be unencumbered by virtualization technology for directed I/O (VT-d).

In one embodiment, the remote server 392 may comprise an anti-virus service 395 and a blacklist virus database 396. In one embodiment, the anti-virus service 395 may support elaborate scanning algorithms and multiple scanning engines to authenticate the anti-virus agents. Such elaborate scanning algorithms are run to detect presence of a malicious code that may be present. In one embodiment, the blacklist virus database 396 may comprise the signature of viruses that may be used by the anti-virus service 395 to authenticate the scanning engine. In one embodiment, the remote server 392 may receive the processor states in response to sending a request to scan the host OS 305 to the ME 340 if the scanning engine is supported on the remote serve 392. In one embodiment, the remote server 392 may use the processor states to scan the host OS 305.

Figure 4:
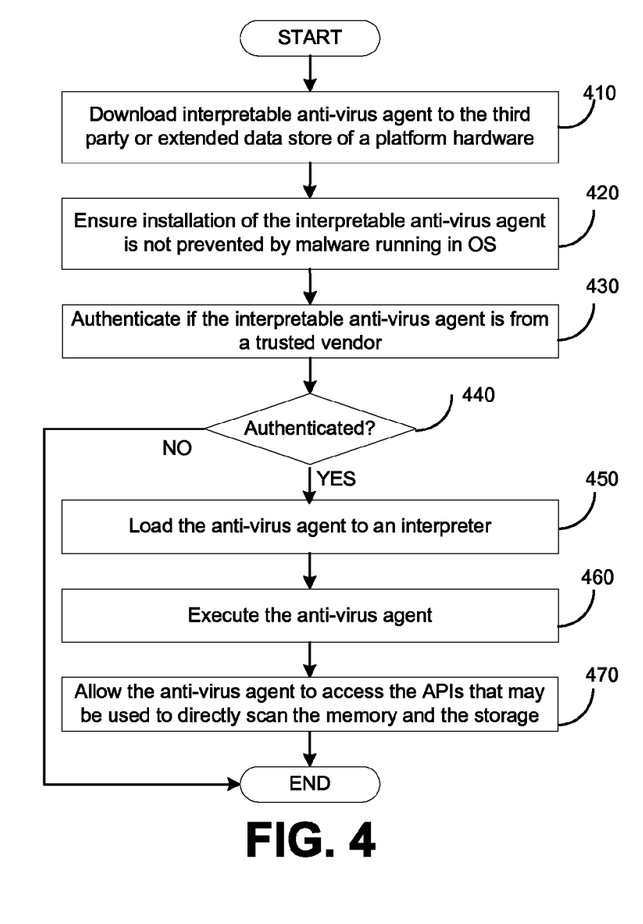
FIG. 4 is a flow-chart illustrating a technique in which components of FIG. 3 together provide authenticated anti-virus agents a direct access to scan memory and storage according to one embodiment

A flow-chart illustrating the operation of the platform components of FIG. 3 that support techniques to provide anti-virus agents a direct access to scan memory and storage are illustrated in FIG. 4.

In block 410, the platform hardware 150 may allow downloading of interpretable anti-virus agent to the third party or extended third party data store or stolen hard-disk space. In one embodiment, the platform hardware 150 may support downloading of anti-virus agents from a local device through VE 350 or over a OOB communication channel 348.

In block 420, the platform hardware 150 may ensure that the downloading of the anti-virus agents is not interrupted by the malware running in the OS 305. In one embodiment, the platform hardware 150 may allow the anti-virus agents to be stored in an isolated ME environment, which may not be affected by the malware running in the OS 305.

In block 430, the platform hardware 150 may authenticate the interpretable anti-virus agents and the scanning engine. In one embodiment, the authentication engine 345 of the manageability engine 340 may verify or check the source, license and such other similar authentication criteria before authenticating the anti-virus agents and the scanning engine.

In block 440, the platform hardware 150 may check whether the anti-virus agents and the scanning engine are authenticated and control passes to block 450 if the anti-virus agents and the scanning engine pass the authentication test.

In block 450, the platform hardware 150 may allow the anti-virus agents to be loaded to the interpreter 396. In block 460, the platform hardware 150 may execute the anti-virus agents. In one embodiment, the ME controller 342 may process the interpreted anti-virus agents. In block 470, the ME controller 342 may allow the anti-virus agents to access the APIs of the scanning to DMA interface 347 that may allow the anti-virus agents to directly scan the memory 370 and the storage device 390.

Figure 5:
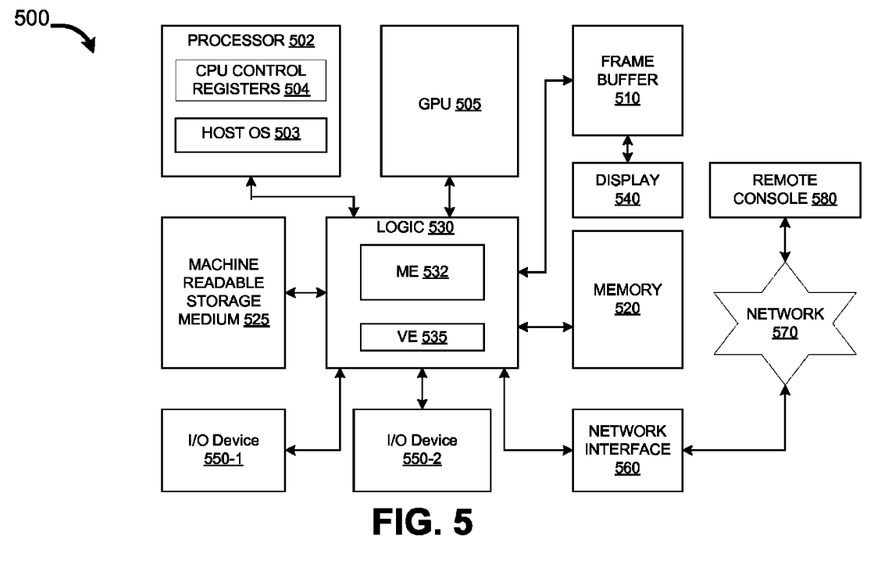
FIG. 5 illustrates a system 500, which provides authenticated anti-virus agents a direct access to scan memory and storage according to one embodiment.

Referring to FIG. 5, a computer system 500 may include a general purpose processor 502 including a single instruction multiple data (SIMD) processor and a graphics processor unit (GPU) 505. The processor 502, in one embodiment, may perform enhancement operations in addition to performing various other tasks or store a sequence of instructions, to provide enhancement operations in a machine readable storage medium 525. However, the sequence of instructions may also be stored in the memory 520 or in any other suitable storage medium.

While a separate graphics processor unit 505 is depicted in FIG. 5, in some embodiments, the graphics processor unit 505 may be used to perform enhancement operations, as another example. The processor 502 that operates the computer system 500 may be one or more processor cores coupled to logic 530. The logic 530 may be coupled to one or more I/O devices 550-1 and 550-2 and network interface 560, which may provide an interface for computer system 500 with network 570. The logic 530, for example, could be chipset logic in one embodiment. The logic 530 is coupled to the memory 520, which can be any kind of storage, including optical, magnetic, or semiconductor storage. The graphics processor unit 505 is coupled through a frame buffer 510 to a display 540.

The logic 530 may support manageability engine ME 532 and virtualizer engine VE 536. In one embodiment, the ME 532 may be similar to the ME 340 and VE 535 may be similar to the VE 350 described with reference to FIG. 3 above. In one embodiment the logic 530 may receive anti-virus agents from an independent software vendor, authenticate the anti-virus agents before allow the anti-virus agents to directly scan the memory or storage devices. In one embodiment, the logic 530 may support downloading of anti-virus agents, authenticate the downloaded anti-virus agents, and allow the anti-virus agents to directly scan the memory and storage device in an isolated environment within the ME 532 independent of the host operating system 503. In one embodiment, the anti-virus agents may be downloaded locally from a device such as USB device or remotely from a remote server over an out of band communication channel.

In one embodiment, the remote console 580 may send a request to scan the host OS 503 and the ME 532 on logic 530 may gather the processor state information of the CPU control registers 504 before providing the processor state information to the remote console 580. In one embodiment, the remote console 580 may use the processor state information to scan the host OS 503.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a computer platform comprising:
receiving, by downloading, anti-virus agents from a remote anti-virus service at a platform hardware space, coupled to the computer platform, that is isolated from an operating system operating on the computer platform, wherein the platform hardware space is not affected by malware running in the operating system;
authenticating the anti-virus agents;
receiving a request from the remote anti-virus service at the platform hardware space to scan the operating system;
providing, by a direct memory access (DMA) engine, an access for the anti-virus agents at the platform hardware space to directly scan a memory coupled to the computer platform via a DMA channel if the authentication of the anti-virus agents is successful; and
transmitting, by the platform hardware space, computer platform processor state information to the remote anti-virus service.

2. The method of claim 1, wherein the anti-virus agents are authenticated by verifying a source from which the anti-virus agents are downloaded, wherein the anti-virus agents are downloaded to a third party data storage provisioned within the platform hardware.

3. The method of claim 2, wherein an anti-virus agent is inhibited from processing if an authentication of the anti-virus agent fails.

4. The method of claim 2, wherein the anti-virus agents are provided a direct access to scan a storage device through a virtualizer engine.

5. The method of claim 1 comprises authenticating a scripting engine before using the scripting engine to support the anti-virus agents to scan the memory through the DMA engine.

6. The method of claim 5 comprises authenticating the scripting engine by verifying a signature of the scripting engine with a key, wherein the key is stored in a flash device.

7. The method of claim 6, wherein the scripting engine is deleted from a static random access memory if the signature of the scripting engine mismatches with the key stored in the flash device.

8. The method of claim 1 wherein transmitting the processor state information comprises transmitting control register information.

9. An apparatus comprising:
a general purpose processor;
a platform control hub coupled with the processor comprising:
a manageability engine that is isolated from an operating system and not affected by malware running in the operating system to:
receive anti-virus agents from a remote anti-virus service,
store the anti-virus agents,
authenticate the anti-virus agents,
receive a request from the remote anti-virus service to scan the operating system, and
transmit computer platform processor state information to the remote anti-virus service; and a direct memory access (DMA) engine to provide an access for the anti-virus agents to directly scan a memory via a DMA channel if the authentication of the anti-virus agents is successful.

10. The apparatus of claim 9, wherein the manageability engine further comprises an authentication engine, wherein the authentication engine is to authenticate the anti-virus agents by verifying the source from which the anti-virus agents are downloaded, wherein the anti-virus agents are downloaded to a third party data storage provisioned within the platform hardware.

11. The apparatus of claim 10, wherein the manageability engine further comprises a controller block, wherein the controller block is to inhibit an anti-virus agent from getting processing if an authentication of the anti-virus agent fails.

12. The apparatus of claim 10 further comprises a virtualizer engine, wherein the virtualizer engine is to provide the anti-virus agents a direct access to scan a storage device through the virtualizer engine.

13. The apparatus of claim 9, wherein the platform control hub is to support a scripting engine, wherein an authentication engine is to authenticate the scripting engine before using the scripting engine to support the anti-virus agents to scan the memory through the DMA engine.

14. The apparatus of claim 13, wherein the authentication engine is to authenticate the scripting engine by verifying a signature of the scripting engine with a key, wherein the key is stored in a flash device.

15. The apparatus of claim 14, wherein the platform control hub is to delete the scripting engine from a static random access memory if the signature of the scripting engine mismatches with the key stored in the flash device.

16. The apparatus of claim 9, wherein transmitting the computer platform processor state information comprises transmitting control register information.

* * * * *